Figure 1:
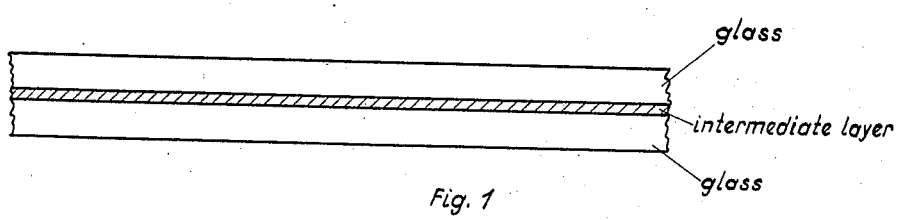

June 7, 1932.  M. HAGEDORN ET AL  1,861,915

SAFETY GLASS

Filed July 12, 1929

Patented June 7, 1932

1,861,915

UNITED STATES PATENT OFFICE

MAX HAGEDORN AND ADOLF JUNG, OF DESSAU-IN-ANHALT, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SAFETY GLASS

Application filed July 12, 1929, Serial No. 377,818, and in Germany July 14, 1928.

Our present invention relates to a new safety glass consisting of two or more glass plates tightly connected by an intermediate sheet and to a process of making the same. It is based on the observation that a safety glass which is made with an intermediate sheet of a cellulose derivative containing the radical of a substituted or unsubstituted, saturated or unsaturated aliphatic acid with more than 3 carbon atoms has many advantages over those made with, for instance, nitro cellulose or acetyl cellulose as a combining stratum. As known in the art films of nitro cellulose "blush" by a decomposition occurring in the course of time. Cellulose acetate films are not fast to the action of water. On that account safety glasses made with aid of nitro cellulose or acetyl cellulose have only a limited value. By using, however, a cellulose derivative of the class, mentioned above, these disadvantages are avoided.

The intermediate layer combining the plates of glass may consist according to our invention, for instance, of cellulose laurate, cellulose stearate, cellulose palmitate, cellulose ricinoleate, cellulose butyrate, cellulose naphthenate, and so on, or we may use for this purpose a mixed cellulose ester, such as cellulose acetate laurate, cellulose acetate butyrate, cellulose butyrate naphthenate, cellulose acetate stearate, cellulose butyrate ricinoleate, cellulose butyrate laurate, or a cellulose ether ester such as, for instance, ethyl cellulose palmitate and so on. Preferably such a cellulose derivative is chosen containing a substituent which imparts to the intermediate sheet an enhanced adhesive power, as for instance, a cellulose derivative, containing the radical of naphthenic or ricinoleic acid. To obtain the same effect we may add to the cellulose derivative forming the intermediate sheet one or more of the softening agents known in the film industry, as, for instance, a resin.

Our new safety glass may be manufactured in the following manner. The intermediate layer is applied on one of the glass plates which is to be united with another. Then the other glass plate is put on the plastic intermediate sheet and the two glass plates are pressed fastly together. Instead thereof, alternatively the intermediate layer may be a sheet, which, if desired, may be softened superficially by means of a solvent and then pressed between the two glass plates.

Furthermore we may provide between the foil serving as an intermediate layer and the glass plates a stratum of an adhesive substance, as, for instance, of cellulose naphthenate, or ricinoleate, or of another cellulose derivative with addition of a softening agent as, for instance, a resin. In order to achieve an intimate union of the intermediate layer with the said adhesive strata, we preferably use the same softening agents in these different layers of the combining film.

When employing a mixed cellulose ester or a cellulose ether ester as the combining sheet it is advantageous to choose as an adhesive stratum a cellulose derivative containing an acid radicle which is, too, a substituent in the cellulose molecule of the intermediate sheet. In this manner, too, a strong combination of the adhesive layers with the intermediate layer is obtained.

The following examples illustrate our invention but without limiting it to the specific details given therein.

*Example 1.*—A film consisting of cellulose laurate is moistened superficially with chloroform. Warmed to a temperature of about 80° C. it is pressed between plates of glass thoroughly cleaned.

*Example 2.*—A solution of 10 grams of cellulose laurate, 2 grams of a polymerized vinyl acetate resin and 2 grams of resorcinol monoacetate in a mixture of 50 cc. of chloroform and benzol in the ratio 1:1 is applied onto 2 plates of glass. The layer on the plates is allowed to dry to such a degree that it remains still sticky. Then the plates are warmed to a temperature of about 80° C. and then pressed together with the sticky layers in contact with each other.

*Example 3.*—A solution containing 10 grams of cellulose naphthalene, 2 grams of a polyvinyl acetate resin and 2 grams of resorcinol monoacetate in 50 cc. of a mixture of methylene chloride and methanol in the ratio 1:1 is applied on two plates of glass and dried. Then a film of cellulose butyrate laurate is put between the two plates which may be warmed to a temperature of about 80° C. and finally the whole is pressed fastly together.

*Example 4.*—The plates of glass to be united are provided with an adhesive stratum according to Example 3 and then pressed together with a film consisting of cellulose acetate butyrate containing 2 per cent of resorcinol monoacetate or a polyvinyl acetate resin.

*Example 5.*—Two plates of glass are provided according to the details given in Example 3 with an adhesive stratum and then united with a film consisting of cellulose butyrate naphthenate.

Figure 2:
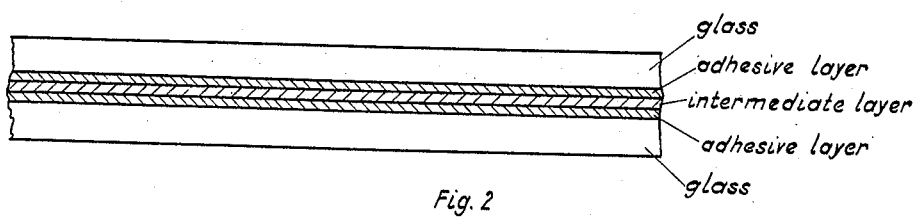

In the accompanying drawing a cross-section of the safety glass obtainable by our invention is seen. Fig. 1 shows the combination of two plates by a single intermediate layer. Fig. 2 shows the combination of two plates by an intermediate layer and two adhesive layers.

What we claim is:

1. A safety glass consisting of a plurality of plates of glass combined by an intermediate layer which contains cellulose acetate butyrate and a polyvinyl acetate resin.

2. A safety glass consisting of a plurality of plates of glass combined by an intermediate layer which contains cellulose acetate butyrate and a polyvinyl acetate resin, said intermediate layer being combined with the plates of glass by an adhesive substance.

3. A safety glass consisting of a plurality of plates of glass combined by an intermediate layer which contains cellulose acetate butyrate and a polyvinyl acetate resin, said intermediate layer being combined with the plates of glass by an adhesive stratum containing cellulose naphthenate and a polyvinyl acetate resin.

4. In a safety glass consisting of a plurality of glass plates and of a sheet of a cellulose derivative containing in its molecule the radical of an aliphatic acid with more than 3 carbon atoms, as an adhesive stratum cellulose naphthenate.

In testimony whereof we affix our signatures.

MAX HAGEDORN.
ADOLF JUNG.